United States Patent
Swiergiel et al.

(10) Patent No.: US 9,200,889 B2
(45) Date of Patent: Dec. 1, 2015

(54) STRAIN GAUGE, AND SYSTEM FOR SPATIALLY LOCATING SUCH GAUGES

(75) Inventors: Nicolas Swiergiel, Champs sur Marne (FR); Catherine Bosquet, Chatillon Sous Bagneux (FR); Sebastien Didierjean, Toulouse (FR)

(73) Assignee: EUROPEAN AERONAUTIC DEFENCE AND SPACE COMPANY EADS FRANCE, Paris (FR)

( * ) Notice: Subject to any disclaimer, the term of this patent is extended or adjusted under 35 U.S.C. 154(b) by 799 days.

(21) Appl. No.: 13/389,485

(22) PCT Filed: Aug. 12, 2010

(86) PCT No.: PCT/FR2010/051708
§ 371 (c)(1),
(2), (4) Date: Feb. 28, 2012

(87) PCT Pub. No.: WO2011/020968
PCT Pub. Date: Feb. 24, 2011

(65) Prior Publication Data
US 2012/0147384 A1 Jun. 14, 2012

(30) Foreign Application Priority Data
Aug. 17, 2009 (FR) ...................................... 09 55694

(51) Int. Cl.
*G01B 11/16* (2006.01)
*G01B 11/14* (2006.01)
(Continued)

(52) U.S. Cl.
CPC ................ *G01B 11/002* (2013.01); *G01B 7/18* (2013.01); *G01L 1/2287* (2013.01); *G01M 5/0016* (2013.01); *G01M 5/0091* (2013.01); *G01S 17/46* (2013.01)

(58) Field of Classification Search
CPC ........ G01B 7/18; G01B 11/002; G01S 17/46; G01M 5/0016; G01M 5/0091; G01L 1/2287
USPC .................... 382/115; 348/77; 356/614; 73/8
See application file for complete search history.

(56) References Cited

U.S. PATENT DOCUMENTS 3,825,343 A * 7/1974 Moore .......................... 356/636
4,123,158 A * 10/1978 Reytblatt ........................ 356/32
(Continued)

FOREIGN PATENT DOCUMENTS

DE          100 38 450 A1    2/2002
EP          1 914 684 A1     4/2008
(Continued)

OTHER PUBLICATIONS

International Search Report, dated Nov. 29, 2010, from corresponding PCT application.

*Primary Examiner* — Tarifur Chowdhury
*Assistant Examiner* — Sunghee Y Gray
(74) *Attorney, Agent, or Firm* — Young & Thompson

(57) ABSTRACT

A strain gauge includes a substrate (2) for mounting an element (3) to be reversibly lengthened by a force applied while displaying a variation in the resistance thereof, the element (3) lengthening itself along an axis for measurement by the gauge. The gauge includes at least one contrast target (5, 6) capable of reflecting an incident light beam, the at least one contrast target (5, 6) being placed on the gauge in a predetermined position that makes it possible to predetermine the center of the axis (4), for measurement by the strain gauge (1), by detecting the position of the at least one contrast target (5, 6).

20 Claims, 1 Drawing Sheet

(51) Int. Cl.
*G01N 19/02* (2006.01)
*G06K 9/00* (2006.01)
*G01B 11/00* (2006.01)
*G01B 7/16* (2006.01)
*G01L 1/22* (2006.01)
*G01M 5/00* (2006.01)
*G01S 17/46* (2006.01)

(56) References Cited

U.S. PATENT DOCUMENTS 5,289,256 A * 2/1994 Gramling .................. 356/477

6,724,930 B1 4/2004 Kosaka et al.
2008/0223152 A1 9/2008 Georgeson et al.
2012/0176629 A1* 7/2012 Allen et al. .................. 356/616

FOREIGN PATENT DOCUMENTS

| JP | 9 005013 A | | 1/1997 | |
|----|---|---|---|---|
| JP | 2009 047501 A | | 3/2009 | |
| JP | 2009047501 | * | 3/2009 | ............. G01B 11/16 |
| WO | 2006/094409 A1 | | 9/2006 | |

* cited by examiner

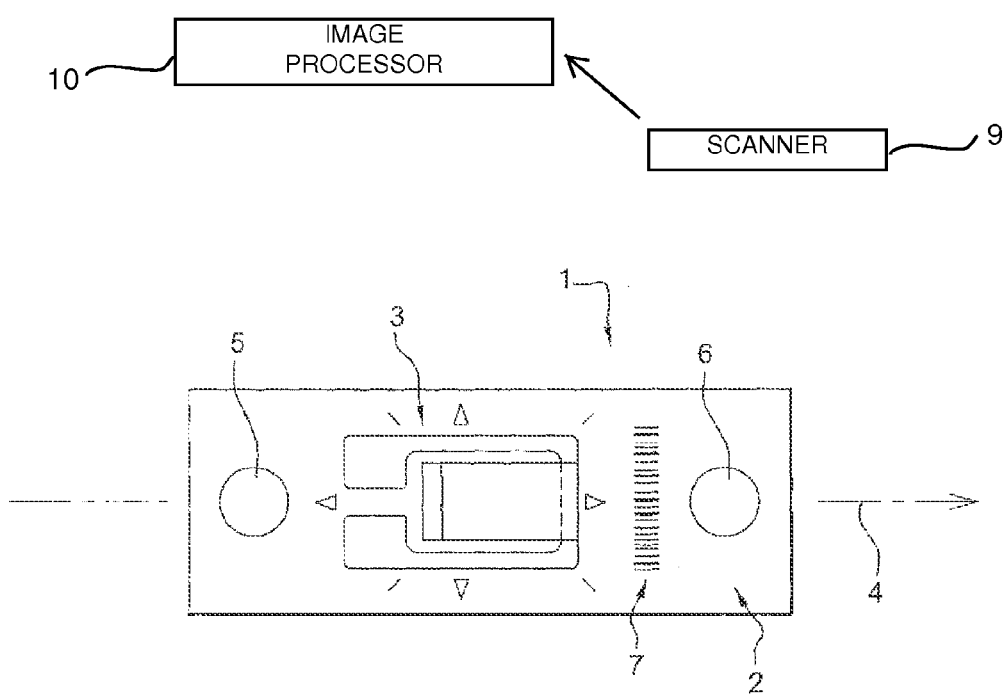

STRAIN GAUGE, AND SYSTEM FOR SPATIALLY LOCATING SUCH GAUGES

BACKGROUND OF THE INVENTION

1. Field of the Invention

This invention relates to a strain gauge, whose position and orientation on the surface of an object can be detected in an optical manner. The invention also relates to a system and method for spatially locating such gauges placed on the surface of an object such as an aircraft structure.

2. Description of the Related Art

Structural tests are known, performed on complete aircraft to validate the predictive calculations made upstream by computerised modelling, of the structural performance of new aeronautical structures (aircraft wings, etc.). These predictive calculations enable manufacturers to make very early strategic decisions on the products being developed.

These structural tests typically involve two types of test: static load tests and dynamic fatigue tests. During these tests, actuators develop loads that are applied to the aircraft structure, for example in order to recreate certain loads encountered in flight.

The behaviour of the structure in response to these stresses is therefore monitored in a permanent manner by means of sensors positioned on the surface of the structure being tested.

These sensors are strain gauges, also known as stress gauges, each measuring the local deformation suffered by the structure.

Each of these strain gauges therefore comprises an element to be reversibly lengthened by means of a force applied while displaying a variation in the resistance thereof. This lengthening takes place along an axis defining the measurement axis of the gauge. By measuring this very low variation in resistance, the deformations suffered in the area of measurement of the gauge by the structure being tested can be traced.

However, a multitude of gauges, typically more than 1,000, are required to test large-scale structures, which involves the need to resort to multi-channel and specialised data acquisition systems.

Given that each of these gauges is manually assembled onto the structure by qualified operators, this assembly operation is particularly laborious, all the more so as each gauge must be wired and calibrated.

Each gauge must be placed in a precisely defined position on the structure so as to correspond to the calculations made and be individually identified in order to associate a measurement with a precise pinpoint area of the real structure being tested.

However, inaccuracies can be observed in the positioning of certain gauges, capable of resulting, for example, in an inaccuracy in the angular orientation of the measurement axis of these gauges, or even in their real location in relation to their theoretical position.

These inaccuracies lead to residual deviations thus distorting the comparison made between the strength of the structural parts calculated and of the real structural parts.

Therefore, it could be highly beneficial to use a system that can easily determine the exact position and orientation of the gauges on the real structure in order to allow for a more exact comparison to be made between the behaviour of the real structure and the values estimated by computer simulation.

BRIEF SUMMARY OF THE INVENTION

The purpose of this invention is therefore to propose a strain gauge, simple in design, easy to operate and economic, allowing for a precise record to be made of the position of the gauge on the surface of a structure in addition to its measurement axis.

This invention also relates to a system and method for spatially locating these strain gauges placed on the outer surface of an object such as an aircraft structure, simple in design, easy to operate and reliable, allowing for the on the fly recording of the position of the gauges on the surface of this object.

For this purpose, the invention relates to a strain gauge comprising a substrate for mounting an element to be reversibly lengthened by means of a force applied while displaying a variation in the resistance thereof, this element lengthening itself along a measurement axis of said gauge.

According to the invention, this strain gauge comprises at least one contrast target capable of reflecting an incident light beam, said at least one contrast target being placed on said gauge in a predetermined position that makes it possible to determine the centre point and the measurement axis of said strain gauge by detecting the position of said at least one contrast target.

Preferably, this detection operation detecting the positions of the contrast targets, and therefore of the gauges, is performed by projecting a light pattern emitted by a light source such as a laser source on the surface of these targets and by detecting the reflection of this light pattern by the structure and these targets.

In different embodiments of this strain gauge, this invention also relates to the following characteristics, which must be considered singly or according to any combinations technically possible:

said at least one contrast target is placed on the outer surface of the substrate supporting said strain gauge, Said at least one contrast target can therefore be directly integrated into the strain gauge.

Alternatively, this or these contrast targets can be add-ons. For illustration purposes only, this or these contrast targets can thus be placed on a support such as a patch, this support comprising an opening intended to receive the strain gauge so that the contrast target(s) are positioned around this gauge, the latter therefore being directly in contact with the surface of the object being measured. This support can therefore be C, U or T-shaped or even be square or rectangular in shape with a central opening matching the dimensions of the strain gauge.

the strain gauge comprises a single contrast target, which comprises at least one marking element for determining the measurement axis of this strain gauge, For illustration purposes only, this contrast target is a disc comprising a groove marking the measurement axis of the strain gauge. Alternatively, this contrast target can be elliptical in shape or be respectively cross-shaped, one of the axes of the ellipse, or one of the branches of this cross respectively defining the measurement axis of the strain gauge.

The position of the centre point of the strain gauge is therefore predetermined and known in relation to the centre point of this contrast target.

the gauge comprises two contrast targets aligned along the measurement axis and placed in an equidistant manner from the centre point of said strain gauge, the gauge comprises three non-aligned contrast targets placed on the outer surface of said substrate so as to allow for determining the centre point of said strain gauge by triangulation, one of said contrast targets having a shape and/or dimensions different to the two other contrast targets and being placed on said measurement axis passing through the centre point of said gauge, these contrast targets are circular retro-reflective targets, moreover, the gauge comprises an identification element placed on the outer surface of said substrate, said identification element enabling said gauge to be individually identified.

This identification element can be a label comprising a clearly inscribed authenticator such as a barcode, the characteristics of this authenticator being entered into a database in order to connect the position of the gauge with its identification. Preferably, this label thus comprises a repositionable adhesive surface on its rear side. Alternatively, this label can comprise a metal border with a particular alloy composition only reacting to a given frequency.

Finally, the invention relates to a system for spatially locating strain gauges placed on the outer surface of a structural element.

According to the invention, said strain gauges are strain gauges as previously described, said system comprises an optical measurement system for determining, within an area of observation of this system, the three-dimensional position of the contrast target (s) of each of these strain gauges in a coordinate system connected to this structural element, and a computing unit for determining, based on the three-dimensional position of these contrast targets placed in the area of observation, the position of the centre point of each gauge and the orientation of this gauge in the coordinate system connected to this structural element.

This optical measurement system is a contactless measurement system.

In different embodiments of this localisation system, this invention also relates to the following characteristics, which must be considered singly or according to any combinations technically possible:

the optical measurement system also comprises an apparatus for reading each of said identification elements in order to associate a gauge identification element with the position of the centre point of each gauge and its orientation in the coordinate system connected to said structural element, The gauge identification element can comprise two tabs connected to each other by a divider line such as a line of least resistance or a pre-cut line, so that a tab can be moved and attached to the gauge wiring. Each of these tabs therefore comprises the same authenticator.

the optical measurement system comprises a self-positioning handheld three-dimensional measurement sensor comprising a laser light pattern projector, a pair of at least two lenses and photodetectors, this sensor generating 2D images from each photodetector, and at least one image processor for processing said pair of 2D images, For the purpose of this document, "self-positioning" means that the system constantly calculates its own position and orientation based on observations made while scanning the geometry of the surface of the structural element. In order to achieve this, the system uses a triangulation principle and integrates a sensor, which senses both 2D surface points originating from the reflection of the laser light pattern on the surface of the structural element and 2D positioning elements originating from the observation made of the positioning elements.

Preferably, the optical measurement system includes a measurement sensor comprising a light pattern projector for forming a light pattern on the surface of said structural element at least in said area of observation, a pair of cameras for acquiring a pair of two-dimensional images of said light pattern on the surface of said structural element and at least part of a set of positioning elements, and a coordinate system of the measurement sensor, said positioning elements being attached to said structural element so that this structural element and, consequently, said coordinate system of the structural element can be moved in space whereas said positioning elements are unmoving on said structural element; an image processor for extracting, from said pair of 2D images, two series of 2D surface points originating from the light pattern and two series of 2D positioning elements originating from said at least part of a series of positioning elements; a 3D surface point calculator for calculating a set of 3D surface points in said coordinate system of the measurement sensor by using said two series of 2D surface points; a 3D positioning element calculator for calculating a set of 3D positioning elements in said coordinate system of the measurement sensor by using said two series of 2D positioning elements; a positioning element adapter for calculating, via computer, the transform parameters in order to characterise a spatial transformation between said coordinate system of the measurement sensor and said coordinate system of the structural element, by coupling the corresponding elements between said calculated set of 3D positioning elements in said coordinate system of the measurement sensor and a reference set of 3D positioning elements in said coordinate system of the structural element, said reference set of 3D positioning elements being obtained from former observations made; a 3D surface point transformer for transforming said calculated set of 3D surface points in said coordinate system of the measurement sensor into a transformed set of 3D surface points in said coordinate system of the structural element by using said transform parameters, a 3D positioning element transformer for transforming said calculated set of 3D positioning elements in said coordinate system of the measurement sensor into a transformed set of 3D positioning elements in said coordinate system of the structural element by using said transform parameters, and a reference positioning element generator for accumulating said transformed set of 3D positioning elements to supply and increase said reference set of 3D positioning elements. Such an optical measurement system is described in the patent application WO 2006/094409 made in the name of the CREAFORM Inc. company.

To this end, the 3D handheld laser scanner, marketed under the name HANDYSCAN 3D, by the CREAFORM Inc. company, Bél-air Street, Lévis, Quebec G6V 6K9 CANADA, is particularly appropriate for the implementation of this invention.

Of course, the surface points in the area of observation obtained by projecting a light pattern and enabling the determination of the geometry of the structural element, in particular comprise the contrast targets of each gauge.

Advantageously, said positioning elements are natural elements of said structural element or additional elements.

the optical measurement system comprises a wireless transmitter to transmit the pair of 2D images from the three-dimensional handheld measurement sensor to the image processor, the computing unit is connected by a link to a storage unit comprising at least one file receiving the position and orientation of each gauge in a coordinate system connected to said structural element in addition to the measurement of variation in its resistance and potentially the identification of said gauge.

Finally, the invention relates to a force measurement system of a structural element, said system comprising a series of strain gauges intended to be placed on the outer surface of said structural element so that each strain gauge detects the force applied to the area of said structural element with which said strain gauge is in contact as a change in the electrical resistance of said strain gauge; and an electrical circuit unit connected to said strain gauge and converting said change in electrical resistance into an output signal.

According to the invention,
these strain gauges are strain gauges as previously described,
said system comprises an optical measurement system for determining, within an area of observation of this measurement system, the three-dimensional position of the contrast targets of each of said strain gauges in a coordinate system connected to said structural element, and
a computing unit for determining, based on the three-dimensional position of said contrast targets placed in said area of observation, the position of the centre point of each gauge and the orientation of said gauge in the coordinate system connected to said structural element.

The invention will be described in more detail with reference to the single appended FIGURE, which represents a view of a strain gauge according to one preferred embodiment of the invention;

BRIEF DESCRIPTION OF THE DRAWING FIGURE

The single FIGURE shows an overhead view of a strain gauge according to one preferred embodiment of the invention.

DETAILED DESCRIPTION OF THE PREFERRED EMBODIMENTS

This strain gauge 1 comprises a substrate 2 for mounting an element 3 to be reversibly lengthened by means of a force applied while displaying a variation in the resistance thereof, this element 3 lengthening itself along a measurement axis 4 of the gauge.

The substrate 2 can be a flexible insulating substrate and extendible to follow the structural deformation experienced, this substrate being capable of being coated in a coating for protecting the element 3 to be lengthened.

This gauge 1 comprises two contrast targets 5, 6 capable of reflecting an incident light beam, these contrast targets 5, 6 being placed on the outer surface of the supporting substrate 2 in predetermined positions that make it possible to determine the theoretical centre point and the measurement axis 4 of the strain gauge by optically detecting the positions of these contrast targets 5, 6.

These two contrast targets 5, 6 are aligned along the measurement axis 4 of the gauge and placed in an equidistant manner from the theoretic centre point of this strain gauge 1 so that the detection of these targets 5, 6 makes it possible to very easily determine the position of the centre point and the measurement axis of this gauge 1.

In this example, these contrast targets 5, 6 are circular retro-reflective targets.

This detection operation detecting the positions of the contrast targets 5, 6 is advantageously performed by projecting a light pattern emitted by a handheld 3D laser scanner 9 on the surface of these targets and by detecting the reflection of this light pattern by the structural element and the contrast targets 5, 6 of the gauges 1.

Moreover, the gauge comprises an identification element 7 placed on the outer surface of the substrate 2, this identification element 7 enabling this gauge 1 to be individually identified. In this example, the identification element 7 is a label containing a barcode.

An optical reader assembled on the handheld 3D laser scanner 9 simultaneously determines the position of the contrast targets 5, 6 in a coordinate system connected to the structural element of the aircraft and the identification of the gauge 1 in order to associate these measurements, which are sent via a wireless transmitter of the handheld 3D laser scanner 9 to a processing unit comprising an image processor 10 for processing the 2D images acquired by the handheld 3D laser scanner 9.

This handheld 3D laser scanner is self-positioning, advantageously enabling the positions of the contrast targets 5, 6 to be determined on the fly.

For illustration purposes only, the light pattern projected by this 3D laser scanner on the surface of the structural element can be a cross.

The invention also relates to a method for spatially locating strain gauges placed on the outer surface of a structural element. These strain gauges each comprise a substrate for mounting an element to be reversibly lengthened by means of a force applied while displaying a variation in the resistance thereof, this element lengthening itself along a measurement axis of the gauge.

These gauges also each comprise at least one contrast target capable of reflecting an incident light beam, these contrast targets being placed on each of these gauges in a predetermined position that makes it possible to determine the centre point and the measurement axis of the corresponding strain gauge by detecting the position of these contrast targets.

A coordinate system is defined, connected to the structural element. Then, an optical measurement system is moved on the outer surface of this structural element, determining, within an area of observation of this system, the three-dimensional position of the contrast target(s) of each of said strain gauges in said coordinate system.

Based on the three-dimensional position of the contrast targets placed in said area of observation, the position of the centre point of each gauge is determined, in addition to the orientation of said gauge in the coordinate system connected to said structural element.

Preferably, the identification element of each strain gauge placed in the area of observation is also determined simultaneously.

The invention claimed is:
1. A strain gauge, comprising:
   a substrate (2) with a measurement axis extending in a longitudinal direction of the substrate;
   an element (3) mounted on the substrate (2), the element having an electrical resistance, an applied force reversibly lengthening the element (3) along the measurement axis, the element (3) displaying a variation in the electrical resistance when lengthened by the applied force;
   at least one contrast target reflecting an incident light beam, said at least one contrast target (5, 6) being placed on said substrate in a predetermined position that allows determining a center position of the measurement axis (4) of said strain gauge (1), by detecting the position of said at least one contrast target (5, 6),
   wherein said at least one contrast target (5, 6) is a retro-reflective target.
2. A gauge according to claim 1, characterised in that it comprises a single contrast target (5, 6), said target comprising at least one marking element for determining the measurement axis (4) of said strain gauge (1).

3. A gauge according to claim 1, characterised in that it comprises two contrast targets (5, 6) aligned along said measurement axis (4) and placed in an equidistant manner from the centre point of said strain gauge (1).

4. A gauge according to claim 3, characterised in that said contrast targets (5, 6) are circular retro-reflective targets.

5. A gauge according to claim 1, characterised in that it comprises three non-aligned contrast targets placed on the outer surface of said substrate (2) so as to allow for determining the centre point of said strain gauge (1) by triangulation, one of said contrast targets (5, 6) having a shape and/or dimensions different to the two other contrast targets (5, 6) and being placed on said measurement axis (4) passing through the centre point of said gauge.

6. A gauge according to claim 1, characterised in that said contrast targets (5, 6) are circular retro-reflective targets.

7. A gauge according to claim 1, characterised in that it also comprises an identification element (7) placed on the outer surface of said substrate (2), said identification element (7) enabling said gauge to be individually identified.

8. A system for spatially locating strain gauges placed on the outer surface of a structural element, said system comprising:
- plural of said strain gauges according to claim 1;
- an optical measurement system for determining, within an area of observation of said system, a three-dimensional position of the contrast target(s) (5, 6) of each of said strain gauges in a coordinate system connected to said structural element; and
- a computing unit for determining, based on the determined three-dimensional position of said contrast targets (5, 6) placed in said area of observation, the position of the center point of each said strain gauge and the orientation of each said strain gauge in the coordinate system connected to said structural element.

9. A system according to claim 8, characterised in that said optical measurement system also comprises an apparatus for reading each of said identification elements (7) in order to associate a gauge identification element with the position of the centre point of each gauge (1) and its orientation in the coordinate system connected to said structural element.

10. A system according to claim 8, wherein said optical measurement system comprises a self-positioning handheld three-dimensional measurement sensor comprising a laser light pattern projector, a pair of at least two lenses and photodetectors, this sensor generating a pair of 2D images from each photodetector, and at least one image processor for processing said pair of 2D images.

11. A system according to claim 10, characterised in that said optical measurement system comprises a wireless transmitter to transmit said pair of 2D images from the three-dimensional handheld measurement sensor to the image processor.

12. A system according to claim 8, characterised in that said computing unit is connected by a link to a storage unit comprising at least one file receiving the position and orientation of each gauge in a coordinate system connected to said structural element in addition to the measurement of variation in its resistance and potentially the identification of said gauge.

13. A gauge according to claim 8, characterised in that said contrast targets (5, 6) are circular retro-reflective targets.

14. A system according to claim 8, wherein said optical measurement system comprises a three-dimensional handheld laser scanner that emits a light pattern onto the contrast targets and detects a reflection of the emitted light off the contrast targets and the structural element, wherein the three-dimensional handheld laser scanner simultaneously determines positions of the contrast targets in the coordinate system connected to the structural element and an identification of each corresponding strain gauge in order to associate these measurements, and the three-dimensional handheld laser scanner is self-positioning by constantly calculating the three-dimensional handheld laser scanner's own position and orientation based on observations made while scanning the geometry of the surface of the structural element.

15. A system according to claim 8, wherein said optical measurement system comprises a self-positioning handheld three-dimensional measurement sensor that projects a light pattern onto the contrast targets and detects a reflection of the emitted light off the contrast targets and the structural element, and generates a pair of 2D images, and at least one image processor for processing said pair of 2D images.

16. A system according to claim 15, wherein said self-positioning handheld three-dimensional measurement sensor is wirelessly connected to transmit said pair of 2D images from the three-dimensional handheld measurement sensor to the image processor.

17. A system according to claim 8, wherein,
said structural element is an aircraft structural element,
said optical measurement system comprises a handheld three-dimensional laser scanner that projects a light pattern onto the contrast targets and detects a reflection of the emitted light off the contrast targets and the aircraft structural element, generates a pair of 2D images, and simultaneously determines the position of the contrast targets in the coordinate system connected to the structural element of the aircraft and the identification of each the strain gauge in order to associate a gauge identification element of each strain gage with the position of the center point of each strain gauge and an orientation in the coordinate system connected to said structural element, and
wherein said handheld three-dimensional laser scanner is wirelessly connected to transmit said pair of 2D images to an image processor for processing said pair of 2D images.

18. A method for spatially locating strain gauges placed on the outer surface of a structural element, characterised in that
said strain gauges are strain gauges according to claim 1,
a coordinate system is defined, connected to said structural element,
an optical measurement system is moved on the outer surface of said structural element, determining, within an area of observation of said system, the three-dimensional position of the contrast target(s) (5, 6) of each of said strain gauges in said coordinate system, and
based on the three-dimensional position of the contrast targets (5, 6) placed in said area of observation, the position of the centre point of each gauge is determined, in addition to the orientation of said gauge in the coordinate system connected to said structural element.

19. A localisation method according to claim 18, characterised in that the identification element (7) of each of said strain gauges placed in said area of observation is also determined simultaneously.

20. A force measurement system of a structural element, said system comprising a series of strain gauges intended to be placed on the outer surface of said structural element so that each strain gauge detects the deformation applied to the area of said structural element with which said strain gauge is in contact as a change in the electrical resistance of said strain gauge; and an electrical circuit unit connected to said strain gauge and converting said change in electrical resistance into an output signal, characterised in that said strain gauges are strain gauges according to claim 1, said system comprises an optical measurement system for determining, within an area of observation of said system, the three-dimensional position of the contrast target(s) (5, 6) of each of said strain gauges in a coordinate system connected to said structural element, and a computing unit for determining, based on the three-dimensional position of said contrast targets (5, 6) placed in said area of observation, the position of the centre point of each gauge and the orientation of said gauge in the coordinate system connected to said structural element.

\* \* \* \* \*